US012769011B2

(12) United States Patent
Wang

(10) Patent No.: US 12,769,011 B2
(45) Date of Patent: Oct. 20, 2026

(54) METHOD FOR POSITIONING SMART WEARABLE DEVICE, AND DEVICE

(71) Applicant: GUANGDONG COROS SPORTS TECHNOLOGY JOINT STOCK COMPANY, Dongguan (CN)

(72) Inventor: Xiaohu Wang, Guangdong (CN)

(73) Assignee: GUANGDONG COROS SPORTS TECHNOLOGY JOINT STOCK COMPANY, Dongguan (CN)

( * ) Notice: Subject to any disclaimer, the term of this patent is extended or adjusted under 35 U.S.C. 154(b) by 254 days.

(21) Appl. No.: 18/436,573

(22) Filed: Feb. 8, 2024

(65) Prior Publication Data

US 2024/0176027 A1 May 30, 2024

Related U.S. Application Data

(63) Continuation of application No. PCT/CN2021/114058, filed on Aug. 23, 2021.

(51) Int. Cl.
*G01S 19/06* (2010.01)

(52) U.S. Cl.
CPC .................................... *G01S 19/06* (2013.01)

(58) Field of Classification Search
CPC .......... G01S 19/06; G01S 5/017; G01S 19/25; G01S 19/28
See application file for complete search history.

(56) References Cited

U.S. PATENT DOCUMENTS

| | | | | |
|---|---|---|---|---|
| 6,538,600 | B1 | 3/2003 | Richton et al. | |
| 2007/0024498 | A1* | 2/2007 | Korneluk | G01S 19/258 342/357.42 |
| 2016/0223680 | A1 | 8/2016 | Gobara et al. | |
| 2022/0107426 | A1 | 4/2022 | Niu et al. | |
| 2023/0016462 | A1 | 1/2023 | Wan et al. | |

FOREIGN PATENT DOCUMENTS

| | | | |
|---|---|---|---|
| CN | 101398477 | A | 4/2009 |
| CN | 102150058 | A | 8/2011 |
| CN | 103823225 | A | 5/2014 |
| CN | 107064966 | A | 8/2017 |
| CN | 108008432 | A | 5/2018 |
| CN | 108919302 | A | 11/2018 |
| CN | 111413722 | A | 7/2020 |

(Continued)

OTHER PUBLICATIONS

International Search Report for PCT Application No. PCT/CN2021/114058, dated May 25, 2022 (6 pages).

(Continued)

*Primary Examiner* — Vladimir Magloire
*Assistant Examiner* — Bongani Jabulani Mashele
(74) *Attorney, Agent, or Firm* — Michael Best & Friedrich LLP

(57) ABSTRACT

A method for positioning a smart wearable device includes that: reference positioning data sent by other devices around the smart wearable device is acquired; a positioning satellite matching the smart wearable device is locked onto according to the reference positioning data; and current positioning data of the smart wearable device is determined based on a navigation message sent by the positioning satellite.

18 Claims, 4 Drawing Sheets

(56) References Cited

FOREIGN PATENT DOCUMENTS

| | | | | | |
|---|---|---|---|---|---|
| CN | 111522045 A | * | 8/2020 | ............. | G01S 19/46 |
| CN | 112513576 A | * | 3/2021 | ............. | G01S 19/45 |
| CN | 113126124 A | | 7/2021 | | |
| JP | 2004-028593 A | | 1/2004 | | |
| JP | 2009-210321 A | | 9/2009 | | |
| TW | 490570 B | * | 6/2002 | | |
| WO | 2019134137 A1 | | 7/2019 | | |

OTHER PUBLICATIONS

European Patent Office Search Report and Written Opinion for Application No. 21954446.7 dated Apr. 7, 2024 (10 pages).

Chinese Patent Office Action for Application No. 202180098209.4 dated May 11, 2026 (16 pages including English machine translation).

* cited by examiner

METHOD FOR POSITIONING SMART WEARABLE DEVICE, AND DEVICE

CROSS-REFERENCE TO RELATED APPLICATION(S)

This is a continuation of International Patent Application NO. PCT/CN2021/114058, filed on Aug. 23, 2021, the disclosure of which is incorporated herein by reference in its entirety.

TECHNICAL FIELD

The present disclosure relates to the technical field of smart devices, for example, a method for positioning a smart wearable device, and a device.

BACKGROUND

Smart wearable devices are becoming more widely used, and more and more requirements can be solved. A smart wearable device with a positioning function greatly facilitates people's lives.

The smart wearable device generally utilizes the global positioning system (GPS) satellite positioning technology to achieve the positioning function. The smart wearable device receives signals from multiple GPS satellites, gradually parses the currently received signals, and analyzes ephemeris data of each satellite in the parsed data, where the ephemeris data includes very detailed satellite orbit and position information; then the smart wearable device calculates an applicable satellite, locks onto the applicable satellite, and then performs positioning by using more than three locked satellites.

However, since the GPS transmits data using a very slow transmission speed of 50*b*/S, it takes a relatively long time to calculate the applicable satellite, and the positioning speed after the GPS satellite positioning is started is very slow, so that the positioning function can be generally implemented in ten minutes to twenty minutes in the open region.

SUMMARY

The present disclosure provides a method for positioning a smart wearable device, and a device.

The present disclosure provides a method for positioning a smart wearable device. The method includes that: reference positioning data sent by other devices around the smart wearable device is acquired, where the reference positioning data includes at least one of reference position data or reference ephemeris data; a positioning satellite matching the smart wearable device is locked onto according to the reference positioning data; and current positioning data of the smart wearable device is determined based on a navigation message sent by the positioning satellite, where the current positioning data includes at least one of current position data or current ephemeris data.

The present disclosure further provides a smart wearable device. The smart wearable device includes a memory, a processor, and a computer program stored on the memory and operable on the processor. The computer program, when executed by the processor, implements the method for positioning a smart wearable device described above.

DETAILED DESCRIPTION

Figure 1:
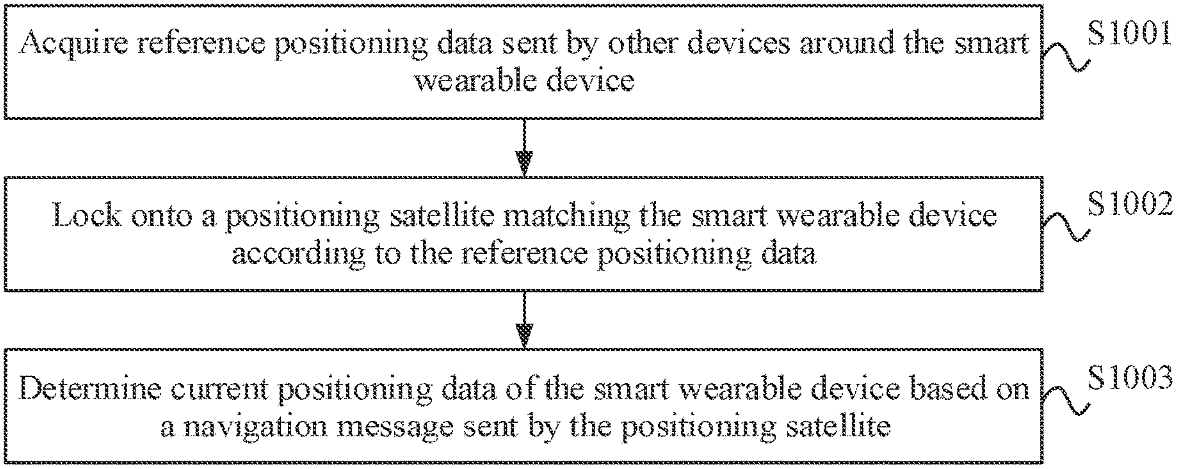
FIG. 1 is a flowchart of a method for positioning a smart wearable device according to an embodiment of the present disclosure.

The present disclosure will be described below in conjunction with the accompanying drawings and embodiments.

Before exemplary embodiments are discussed, it should be mentioned that some exemplary embodiments are described as processes or methods depicted as flowcharts. Although the flowcharts describe multiple steps as sequential processes, many of these steps may be performed in parallel, concurrently, or simultaneously. Moreover, the order of the multiple steps may be rearranged. The processes may be terminated when their operations are completed, but may also have additional steps not included in the drawings. The processes may correspond to methods, functions, procedures, subroutines, subprogram and the like.

The GPS satellite positioning is divided into cold start and hot start, and the cold start is a repositioning start in which a GPS receiver does not store valid ephemeris, time and position information. The hot start is a repositioning start in which the GPS receiver stores information such as valid ephemeris data, time and position.

Once a GPS terminal is successfully located, the last positioning location information (including longitude, latitude and altitude), the number and trajectory of satellites above the last positioning location and predicted positions of these satellites within four hours, i.e. short-term ephemeris, are generally kept/updated in a memory of a GPS receiving chip. Depending on this group of data, after the GPS terminal is powered off or loses a signal, the GPS terminal is restarted (that is hot start) to receive a satellite signal, all satellites do not need to be traversed, and an applicable satellite may be locked onto only by simply adjusting the pairing according to the short-term ephemeris, thereby achieving the quick positioning.

When the GPS terminal is powered off for too long time or the GPS terminal has changed greatly in geographic position, for example, over 200 km, the ephemeris and the "last positioning location information" in the memory are greatly different from the ephemeris corresponding to the satellite above the current position and the current position respectively, and at this time, starting the GPS for positioning belongs to a GPS cold start, and the GPS cold start requires a long time to perform the accurate positioning.

In order to avoid the slow positioning of the cold start of the GPS terminal, an assisted GPS (A-GPS) technology is provided, and an A-GPS terminal needs to transmit base station address information of the A-GPS terminal to a positioning server through a network; the positioning server is configured to transmit, according to an approximate position of the A-GPS terminal, GPS auxiliary information (including ephemeris, azimuth angle, elevation angle and the like of GPS) related to this position to the A-GPS terminal; an A-GPS module of the A-GPS terminal receives a GPS original signal according to the auxiliary information; after the GPS original signal is received, the A-GPS terminal demodulates the signal, calculates pseudo-ranges (namely, distances influenced by various GPS errors) from the A-GPS terminal to satellites, and transmits related information to the positioning server through a network; the positioning server completes the processing of the GPS information according to the transmitted GPS pseudo-range information and auxiliary information from other positioning devices (such as, a differential GPS reference station) and estimates the position of the A-GPS terminal; the positioning server transmits the position of the A-GPS terminal to a positioning gateway or an application platform (such as, a GPS application on the A-GPS terminal) through a network. However, the A-GPS terminal needs to be located in an open region such as outdoors to have the high positioning accuracy, that is, is limited by the environment where the A-GPS is located, so that the A-GPS terminal cannot acquire signals transmitted from multiple satellites when the A-GPS terminal is located in a limited environment such as indoors; moreover, the positioning of the A-GPS terminal needs to be achieved through multiple times of network transmission (up to six times of one-way transmission), so that the A-GPS terminal occupies a large amount of air resources for operators, generates more network traffic cost for consumers, and has high power consumption for the A-GPS positioning function, which indirectly shortens the standby time of the A-GPS terminal.

An embodiment of the present disclosure provides a method for positioning a smart wearable device. FIG. 1 is a flowchart of a method for positioning a smart wearable device according to an embodiment of the present disclosure. In the embodiment of the present disclosure, the smart wearable is positioned quickly, the method may be executed by an apparatus for positioning a smart wearable device, and the apparatus may be implemented by software and/or hardware. As shown in FIG. 1, the method includes steps described below.

In S1001, reference positioning data sent by other devices around the smart wearable device is acquired.

The smart wearable device is a general term for a wearable device that is developed by using wearable technology to intelligentize daily wear, such as a watch, a bracelet, spectacles and clothes. The reference positioning data refers to data capable of determining a reference position, and the reference positioning data may include, for example, reference position data and/or reference ephemeris data. The reference position data refers to data related to the reference position, and may include, for example, the longitude and latitude of the reference position, and moreover, the reference position may further include a height of the reference position. The reference ephemeris data includes reference satellite orbit data, i.e., ephemeris data of a satellite above positioning locations of the other devices within a first preset time, and the first preset time here may be less than or equal to 60 minutes, such as 15 minutes, 20 minutes, 25 minutes, 30 minutes, 35 minutes, or 40 minutes.

Accordingly, the other devices around the smart wearable device may be devices within a preset distance range around the smart wearable device, and the preset distance range may be, for example, a range less than one hundred kilometers, a range less than ten kilometers, or a range less than one kilometer, and may be determined depending on actual conditions.

As such, when the reference position data sent unidirectionally by the other devices around the smart wearable device is acquired, the reference position data can directly reflect a current position of the other devices. Since a distance between the other devices and the smart wearable device is relatively close, the smart wearable device may determine a region in which the smart wearable device is located based on the reference position data, so as to reduce the positioning range of the smart wearable device. When the reference ephemeris data sent unidirectionally by the other devices around the smart wearable device is acquired, the reference ephemeris data is ephemeris data in a relatively short time, and the data amount of the reference ephemeris data is small, so that the data processing amount can be reduced. Since a distance between the smart wearable device and the other devices around the smart wearable device is relatively close, the smart wearable device may quickly learn, based on the ephemeris data in the relatively short time from the other devices, the operating satellite within a certain region above the position where the smart wearable device is located.

The other devices may be any device having a positioning function and capable of unidirectionally sending the reference positioning data, and the other devices may include a portable device and/or a stationary device. The portable device refers to a device easily carried between sites of use, for example a wearable device such as a mobile phone, a watch, a wristband, an earpiece, and glasses, and may also be other portable devices such as a positioning button, a machine case, a luggage case and a navigator which may conveniently move. The stationary device may be a non-portable device such as a server and a base station.

In the embodiments of the present disclosure, the reference positioning data sent unidirectionally by the other devices is acquired, and the unidirectional sending of the reference positioning data by the other devices is a behavior in which the other devices autonomously send the reference positioning data, no matter whether the smart wearable device intends to acquire the reference positioning data sent by the other devices. That is, when the other devices satisfy a sending condition of the reference positioning data, no matter whether there is a smart wearable device around intending to receive the reference positioning data sent by the other devices, the other devices send the reference positioning data. Therefore, when the smart wearable device acquires the reference positioning data, the smart wearable device does not need to make a data sending request to other devices around the smart wearable device, so that the smart wearable device does not have a data interaction behavior with other devices around the smart wearable device. As such, on the one hand, the smart wearable device does not perform the data interaction with other devices, does not occupy a large amount of air resources, and does not need to occupy a data communication frequency band, so that the reference positioning data may be acquired without being affected by the density of receiving end devices. Therefore, the reference positioning data can be quickly and stably acquired, the transmission rate of the reference positioning data can be improved, the time required for acquiring the reference positioning data can be shortened, and meanwhile, the power consumption can be reduced, and the standby time can be increased. On the other hand, since other devices send the reference positioning data unidirectionally, a manner in which the reference positioning data is acquired may not be limited to the environment in which the smart wearable device is located, whether an operator is set up, and the like.

In an embodiment, a manner in which the other devices may unidirectionally send the reference positioning data may be in a near field transmission manner, that is, a short-distance, low-power transmission manner. The near field transmission manner may include, but is not limited to, a radio frequency (RF) transmission, such as broadcast RF, near field communication (NFC), and radio frequency identification (RFID).

Exemplarily, when the other devices around the smart wearable device send the reference positioning data in a manner of the broadcast RF, the other devices around the smart wearable device send, as transmitting sources, the reference positioning data by radio waves, and the smart wearable device receives, as a receiving object, the reference positioning data directly.

When the other devices around the smart wearable device sends the reference positioning data in a manner of the NFC, the other devices around the smart wearable device may be used as initiating devices, while the smart wearable device is used as a target device. The other devices around the smart wearable device provide a radio frequency field to send the reference positioning data to the smart wearable device. For example, when the other devices around the smart wearable device are stationary devices (such as a base station), the base station may provide a corresponding radio frequency field, and send a position of the base station itself as the reference positioning data. When the smart wearable device is located in the radio frequency field provided by the base station, the smart wearable device may directly acquire the reference positioning data in the radio frequency field. Similarly, when the other devices around the smart wearable device are portable devices (such as a smart terminal), the smart terminal may provide a corresponding radio frequency field and send positioning data of the smart terminal itself as the reference positioning data, and when the smart wearable device is in the radio frequency field provided by the smart terminal, the smart wearable device may directly acquire the reference positioning data in the radio frequency field.

When the other devices around the smart wearable device send the reference positioning data in a manner of RFID, the smart wearable device may be used as an interrogator, while the other devices around the smart wearable device may be used as a transponder. The other devices around the smart wearable device establish a corresponding magnetic field as a magnetic field source, and may actively send the reference positioning data at a frequency. When the smart wearable device enters the magnetic field established by the other devices, the smart wearable device may read the reference positioning data sent by the other devices.

In S1002, a positioning satellite matching the smart wearable device is locked onto according to the reference positioning data.

When the reference positioning data includes the reference position data, a region in which the smart wearable device is located may be quickly determined according to the reference position data. At this time, operating satellites above this region are searched, and a corresponding satellite may be selected as the positioning satellite of the smart wearable device according to a certain satellite cut-off angle. When the reference positioning data includes the reference ephemeris data, operating satellites within a certain region above a position where the smart wearable device is located may be quickly learnt according to the reference ephemeris data, and a corresponding satellite is selected, according to a certain satellite cut-off angle, as the positioning satellite of the smart wearable device among the operating satellites within the region. As such, compared with a manner of searching all operating satellites to lock onto the positioning satellite, based on the reference positioning data, only satellites in a certain region need to be searched, so that the positioning satellite matching the smart wearable device may be quickly locked onto, thereby saving the time required for locking onto the positioning satellite, and reducing the power consumption generated by searching for the satellite. Since the positioning is performed based on the positioning satellite, the longitude, the latitude, the height and the like of a position where a smart wearable device is located need to be acquired, so that at least three positioning satellites are locked onto.

In S1003, current positioning data of the smart wearable device is determined based on a navigation message sent by the positioning satellite.

The current positioning data is data capable of determining position information of the smart wearable device, and the current positioning data here may also include current position data and/or current ephemeris data. When the current positioning data is the current position data, the current position data may include longitude, latitude and height. When the current positioning data is the current ephemeris data, the current ephemeris data may be ephemeris data of the positioning satellite within the first preset time.

If the current positioning data is the current position data, after the positioning satellite of the smart wearable device is locked onto, a navigation message sent by the positioning satellite may be received in real time. The navigation message may include ephemeris data, a working condition, clock correction, ionospheric delay correction, atmospheric refraction correction, and other information of the positioning satellite. Based on the ephemeris data of the positioning satellite, the current position of the positioning satellite may be found, and a distance from the smart wearable device to the positioning satellite may be obtained by multiplying the recorded time elapsed it takes for the positioning satellite to send the navigation message to the smart wearable device by the speed of light. As such, an equation is established, and a three-dimensional coordinate of a position where the smart wearable device is located, i.e., the longitude, latitude and height of the position where the smart wearable device is located, can be solved, so that the smart wearable device is configured to, in response to the longitude, latitude and height, achieve the positioning of the smart wearable device, and the longitude, latitude and height of the position where the smart wearable device is located are used as the current position data of the smart wearable device.

Similarly, if the current positioning data is the current ephemeris data, after the positioning satellite of the smart wearable device is locked onto, a navigation message sent by the positioning satellite may be received in real time, and the navigation message may include ephemeris data, a working condition, clock correction, ionospheric delay correction, atmospheric refraction correction, and other information of the positioning satellite, so that the ephemeris data of the positioning satellite within the first preset time may be directly determined as the current ephemeris data of the smart wearable device. The determination of the longitude, latitude, and height at the position where the smart wearable device is located may refer to the determination of the current position data of the smart wearable device, and details are not described herein. In this case, the smart wearable device may also be enabled to locate the smart wearable device in response to the determined longitude, latitude and height.

In an embodiment, the other devices around the smart wearable device may include a portable device and/or a stationary device. A position where the stationary device is located is fixed and a position where the portable device is located may be varied. Therefore, when one other device around the smart wearable device is a portable device, the portable device may determine its positioning data as the reference positioning data through an auxiliary device associated with this portable device, and the auxiliary device may be a networked device, a base station, a server, and the like provided with an operator; or when one other device around the smart wearable device is a portable device, the portable device may also determine its positioning data as the reference positioning data in a manner of GPS hot start or GPS cold start.

Exemplarily, a user is flown from a city A to a city B with the smart wearable device, and the two cities are more than two hundred kilometers apart; after the user arrives at the city B, the smart wearable device of the user needs to be relocated. At this time, the reference positioning data, which is sent unidirectionally by other devices that have completed the positioning in the city B, may be acquired, and the positioning satellite of the smart wearable device is locked onto based on the reference positioning data, so that the quick positioning may be achieved based on the navigation message sent by the positioning satellite.

According to the embodiments of the present disclosure, the reference positioning data sent unidirectionally by the other devices around the smart wearable device is acquired, corresponding reference positioning data may be acquired without networking and data interaction, which is beneficial to shortening the time required for acquiring the reference positioning data and reducing the power consumed for acquiring the reference positioning data. Compared with the GPS hot start, the positioning satellite of the smart wearable device may be quickly locked onto based on the reference positioning data without traversing all satellites, and whereby the smart wearable device achieves the quick positioning, which is beneficial to shortening the positioning time, improving the positioning speed, and reducing the power consumption of the smart wearable device.

After the smart wearable device completes the positioning, the smart wearable device may also be used as a transmitting source of the reference positioning data so as to unidirectionally send the reference positioning data to other smart devices around the smart wearable device.

Figure 2:
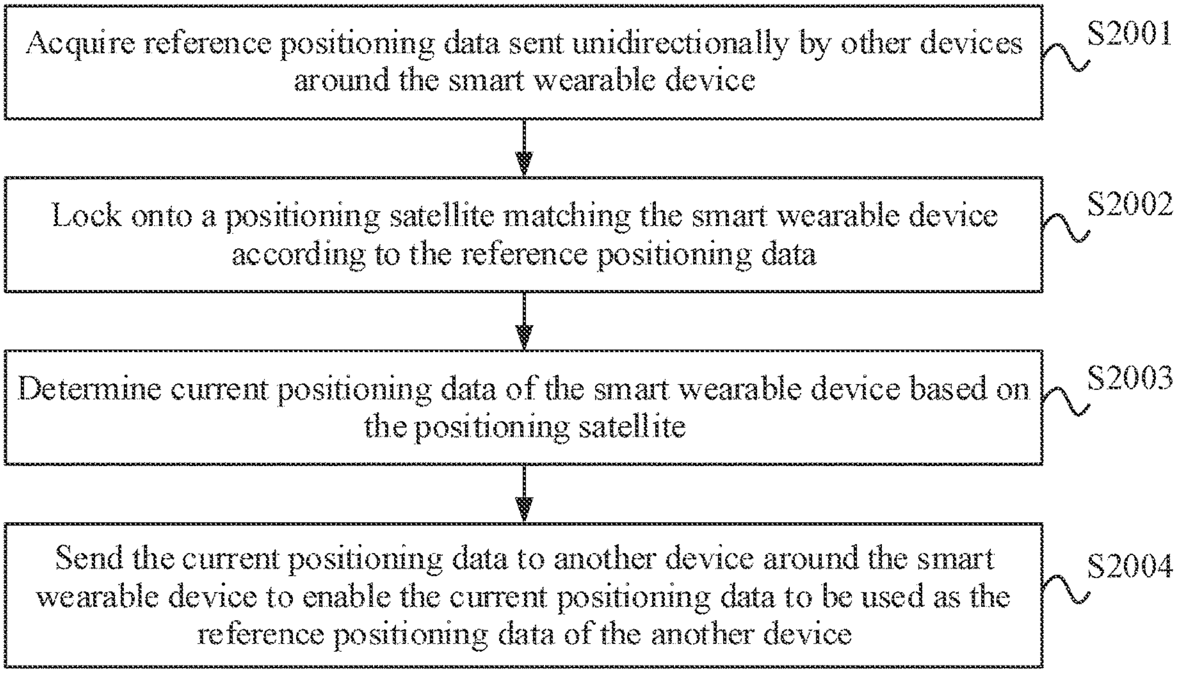
FIG. 2 is a flowchart of another method for positioning a smart wearable device according to an embodiment of the present disclosure.

In an embodiment, FIG. 2 is a flowchart of another method for positioning a smart wearable device according to an embodiment of the present disclosure. As shown in FIG. 2, the method includes steps described below.

In S2001, reference positioning data sent unidirectionally by other devices around the smart wearable device is acquired.

In S2002, a positioning satellite matching the smart wearable device is locked onto according to the reference positioning data.

In S2003, current positioning data of the smart wearable device is determined based on the positioning satellite.

In S2004, the current positioning data is sent to another device around the smart wearable device to enable the current positioning data to be used as the reference positioning data of the another device.

The smart wearable device and other devices around the smart wearable device may be the same type of device or different types of devices, which is not limited in the embodiments of the present disclosure.

After the current positioning data of the smart wearable device is determined, the smart wearable device may implement the positioning of the smart wearable device in response to the current positioning data of the smart wearable device. At this time, the determined current positioning data of the smart wearable device may be, as the reference positioning data, sent unidirectionally to another device around the smart wearable device, so that when the another device around the smart wearable device needs to be positioned, the reference positioning data sent by the smart wearable device may be directly acquired, thereby enabling the another device to achieve the quick positioning based on the reference positioning data sent by the smart wearable device. A manner in which the smart wearable device unidirectionally sends the current positioning data may also be a near field transmission manner such as broadcast RF, NFC, or RFID. Meanwhile, other devices capable of acquiring the reference positioning data sent by the smart wearable device may also be other devices within a preset distance range around the smart wearable device, and the closer the distance from the smart wearable device is, the easier the acquisition of the reference positioning data is.

Exemplarily, smart wearable device C1 locks onto a positioning satellite that matches smart wearable device C1 according to reference positioning data sent unidirectionally by smart wearable device C2, and determines the current positioning data of smart wearable device C1 based on the positioning satellite to locate smart wearable device C1. At this time, smart wearable device C1 may unidirectionally send its current positioning data determined based on the positioning satellite as reference positioning data. When smart wearable device C3 acquires the reference positioning data sent by smart wearable device C1, smart wearable device C3 may also lock onto a positioning satellite highly matching smart wearable device C3 according to the reference positioning data sent by smart wearable device C1, and determine the current positioning data of smart wearable device C3, thereby enabling smart wearable device C3 to achieve the quick positioning.

As such, any one smart wearable device may be used as a transmission source of reference positioning data after the positioning of the smart wearable device is successful, so that the difficulty of acquiring the reference positioning data can be reduced, and thus the positioning speed of the smart wearable device is improved.

Figure 3:
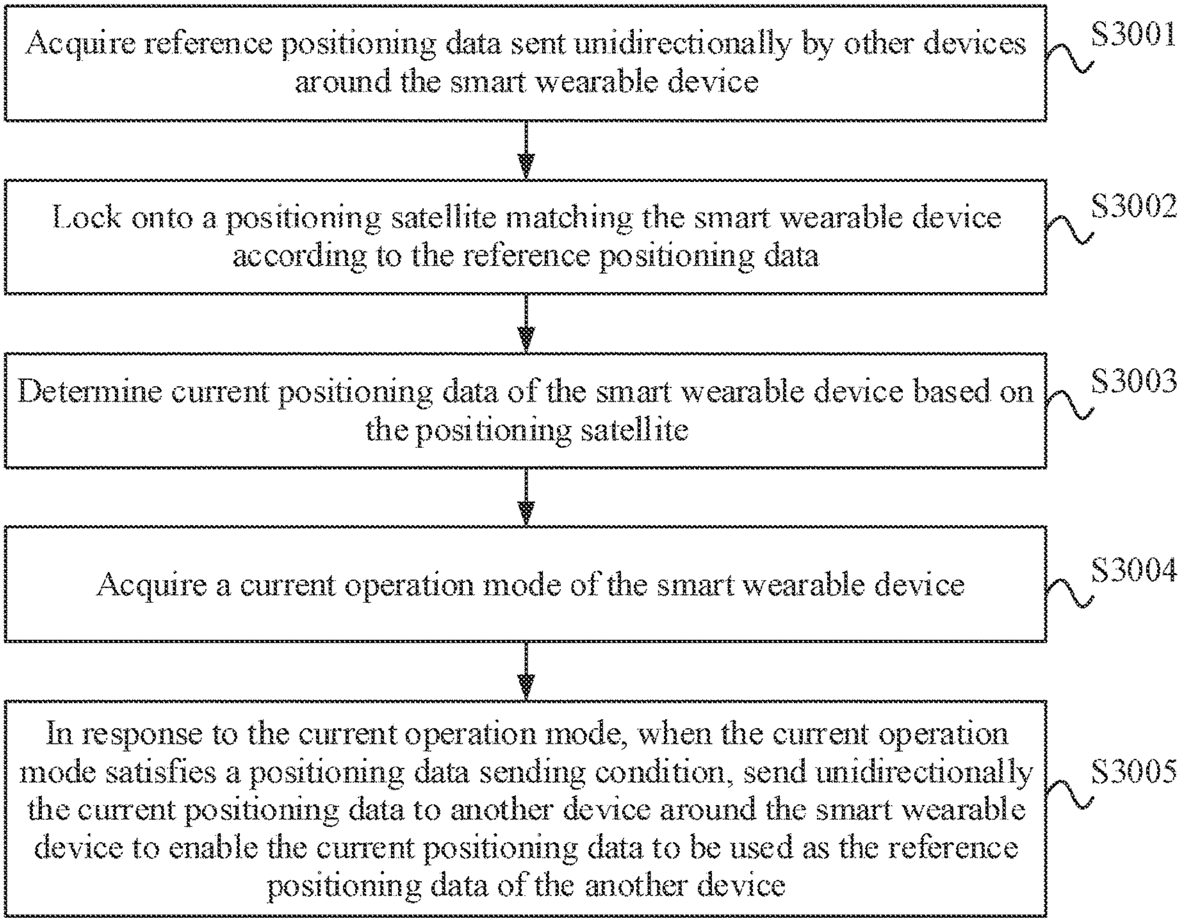
FIG. 3 is a flowchart of another method for positioning a smart wearable device according to an embodiment of the present disclosure.

In an embodiment, when the current positioning data is sent to another device around the smart wearable device to enable the current positioning data to be used as the reference positioning data of the another device, certain data processing space and resources are occupied, so that the smart wearable device has high power consumption and/or the positioning speed of the smart wearable device is influenced. Therefore, whether the smart wearable device is suitable for sending the reference positioning data may be determined based on the operation mode of the smart wearable device. FIG. 3 is a flowchart of another method for positioning a smart wearable device according to an embodiment of the present disclosure. As shown in FIG. 3, the method includes steps described below.

In S3001, reference positioning data sent unidirectionally by other devices around the smart wearable device is acquired.

In S3002, a positioning satellite matching the smart wearable device is locked onto according to the reference positioning data.

In S3003, current positioning data of the smart wearable device is determined based on the positioning satellite.

In S3004, a current operation mode of the smart wearable device is acquired.

In S3005, in response to the current operation mode, when the current operation mode satisfies a positioning data sending condition, the current positioning data is unidirectionally sent to another device around the smart wearable device to enable the current positioning data to be used as the reference positioning data of the another device.

The operation mode of the smart wearable device may include, but is not limited to, a daily mode, a motion preparation mode, a motion mode, and the like. The motion preparation mode is an operation mode in which a recording of a motion state is not entered, and the motion mode is an operation mode in which a real-time recording of the motion state is started. The recorded motion state may include, but is not limited to, a heart rate of a user, a speed of a user, an acceleration of a user, an oxygen saturation of a user, a real-time position of a user, and the like. The daily mode may be any other mode such as a non-motion preparation mode and a non-motion mode such as an instant messaging mode, a standby mode, or a normal display mode.

The data sending condition may include, but is not limited to, that the smart wearable device has not experienced a large displacement and/or that the displacement is relatively slow. For example, when the smart wearable device is in the motion preparation mode, the user may perform the warm-up motion in place and/or a command waiting for the start of the motion, and the like. At this time, the user does not enter a real motion state, the smart wearable device does not generate a large displacement, and this displacement may include, but is not limited to, a displacement in a height direction and/or a displacement in a longitude and latitude direction. The motion preparation mode may include, but is not limited to, a running preparation mode, an off-road preparation mode, a swimming preparation mode, a triathlon preparation mode, and the like.

The current operation mode of the smart wearable device may be determined by the user operation selection. For example, the user may open the corresponding application software, and may click and select the operation mode of the smart wearable device in the application software. If the user selects the motion preparation mode, it indicates that the user does not perform the large-scale motion and/or fast motion, and the user usually stays in place to warm up. In this case, the smart wearable device does not need to perform the real-time positioning, and does not need to record the motion state of the user, so that the operation space and resources inside the smart wearable device are sufficient. When it is considered that the smart wearable device satisfies the positioning data sending condition, the current positioning data is sent unidirectionally to the another device around the smart wearable device to enable the current positioning data to be used as the reference positioning data of the another device. Alternatively, the current operation mode of the smart wearable device may be detected in real time by the motion detection sensor in the smart wearable device. At this time, the motion data of the smart wearable device is acquired, and the current operation mode of the smart wearable device is determined according to the motion data. The motion detection sensor may include, but is not limited to, a height detection sensor, a speed detection sensor, or an acceleration detection sensor. The motion data may be height data, velocity data, or acceleration data. For example, when a height detected by the motion detection sensor is less than a height threshold, a speed detected by the motion detection sensor is less than a speed threshold, or an acceleration detected by the motion detection sensor is less than an acceleration threshold, then the current operation mode thereof is considered to satisfy the positioning data sending condition.

Exemplarily, the motion detection sensor being the height detection sensor is used as an example, the height detection sensor may detect the swing arm amplitude of a user wearing the smart wearable device, and determine whether the smart wearable device is in a motion mode. When the swing arm amplitude of the user detected by the height detection sensor is less than the height threshold, the user is considered to be not in the motion mode, and when it is considered that the smart wearable device satisfies the positioning data sending condition, the current positioning data is sent unidirectionally to the another device around the smart wearable device to enable the current positioning data to be used as the reference positioning data of the another device. On the contrary, when the swing arm amplitude of the user detected by the height detection sensor is greater than or equal to the height threshold, the smart wearable device is determined to be in the motion mode, and then the reference positioning data may be stopped being sent unidirectionally to the another device around the smart wearable device, so that the operation space and resources occupied by the smart wearable device due to a fact that the reference positioning data is sent are released, the power consumption of the smart wearable device can be reduced, and the quick operation of the smart wearable device is facilitated.

In an embodiment, in a case where the user is not detected to be performing at least one of a large movement or a fast movement, the smart wearable device is controlled to transmit the current positioning data.

For example, the user performs a large movement, e.g., the user swings his or her arm wide.

For example, the user performs a fast movement, e.g., the user performs a large displacement.

In an embodiment, it is determined whether the user performs at least one of the large movement or the fast movement based on the motion data.

In an embodiment, it is determined whether the user performs at least one of the large movement or the fast movement based on the motion mode.

Figure 4:
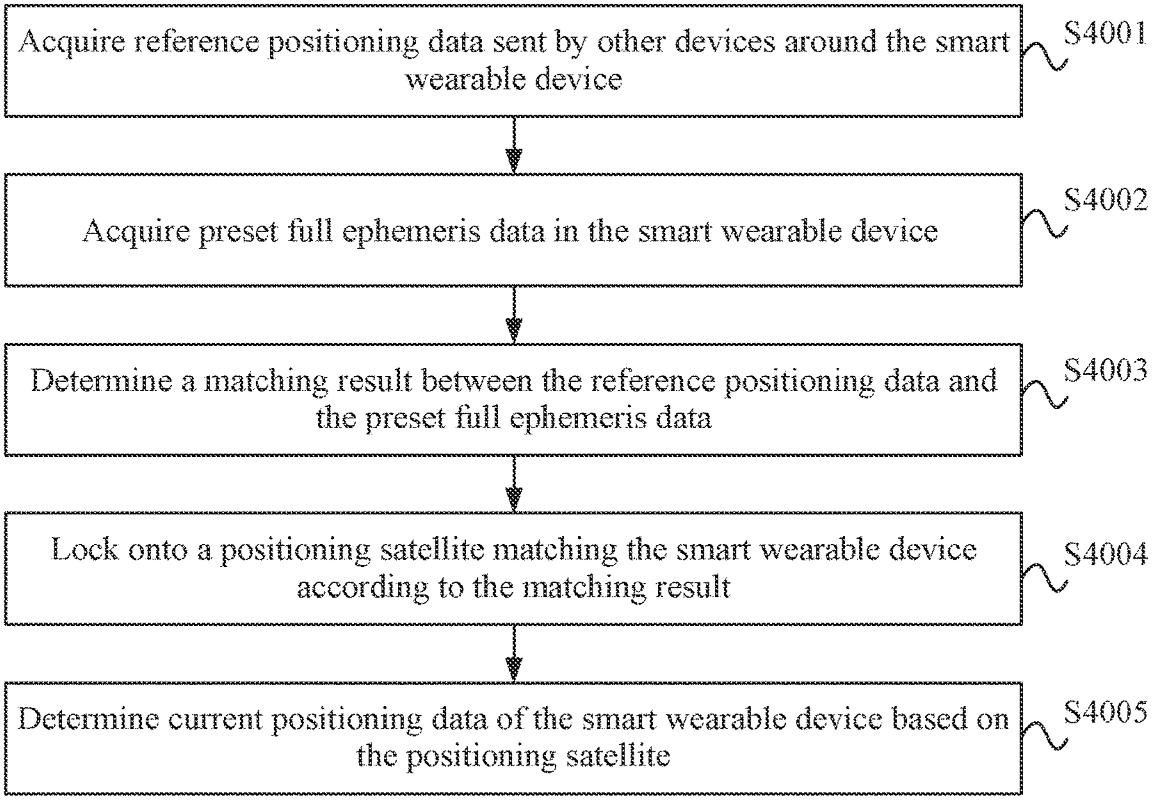
FIG. 4 is a flowchart of another method for positioning a smart wearable device according to an embodiment of the present disclosure.

In an embodiment, the reference positioning data is data related to a positioning position of other devices, and when the positioning satellite matching the smart wearable device is locked onto based on the reference positioning data, it is also necessary to refer to the preset full ephemeris data in the smart device. FIG. 4 is a flowchart of another method for positioning a smart wearable device according to an embodiment of the present disclosure. As shown in FIG. 4, the method includes steps described below.

In S4001, reference positioning data sent by other devices around the smart wearable device is acquired.

In S4002, preset full ephemeris data in the smart wearable device is acquired.

The preset full ephemeris data, i.e., ephemeris data of all satellites existing in the smart wearable device, may be ephemeris data of all satellites within N days, where $0<N\leq30$, where N may be, for example, 10 days, 20 days, or 30 days. The preset full ephemeris data may be full ephemeris data downloaded from an auxiliary device associated with the smart wearable device when the smart wearable device is connected to the auxiliary device, and the full ephemeris data may be downloaded periodically to achieve the real-time updating of the preset full ephemeris data, so that positioning accuracy can be improved when the preset full ephemeris data is subsequently used for positioning. The download period may be M days, and M may be greater than or equal to 20. The auxiliary device may be a smart terminal such as a mobile phone or a computer, or may be a base station, and the like. When the auxiliary device is a mobile phone, the mobile phone may update the stored full ephemeris data in real time through the networking of operators.

In S4003, a matching result between the reference positioning data and the preset full ephemeris data is determined.

In S4004, a positioning satellite matching the smart wearable device is locked onto according to the matching result.

Since the preset full ephemeris data includes ephemeris data of all satellites, when the reference positioning data is reference ephemeris data, a satellite matching the reference ephemeris data may be directly found from the preset full ephemeris data, an operating satellite within a certain region above the position where the smart wearable device is located may be determined, and a corresponding satellite is selected as the positioning satellite of the smart wearable device according to a certain satellite cut-off angle from the operating satellites within the region. When the reference positioning data is reference position data, a region in which the smart wearable device is located may be determined, and all operating satellites above the region where the smart wearable device is located may be known by the preset full ephemeris data. A corresponding satellite is selected as the positioning satellite of the smart wearable device according to a certain satellite cut-off angle from all operating satellites above the region where the smart wearable device is located. As such, the operating satellite within a certain region may be determined by comparing the reference positioning data with the preset full ephemeris data, and the positioning satellite of the smart wearable device may be quickly locked onto by searching the operating satellite within the region, so that the positioning time of the smart wearable device can be greatly shortened, and the positioning speed of the smart wearable device can be improved.

In S4005, current positioning data of the smart wearable device is determined based on the positioning satellite.

According to the embodiments of the present disclosure, the positioning satellite of the smart wearable device may be quickly locked out through the preset full ephemeris data and the reference positioning data in the smart wearable device, so that the quick positioning of the smart wearable device can be achieved based on the positioning satellite, which is beneficial to shortening the time required for locking onto the positioning satellite, and improving the positioning speed and the positioning accuracy of the smart wearable device.

Figure 5:
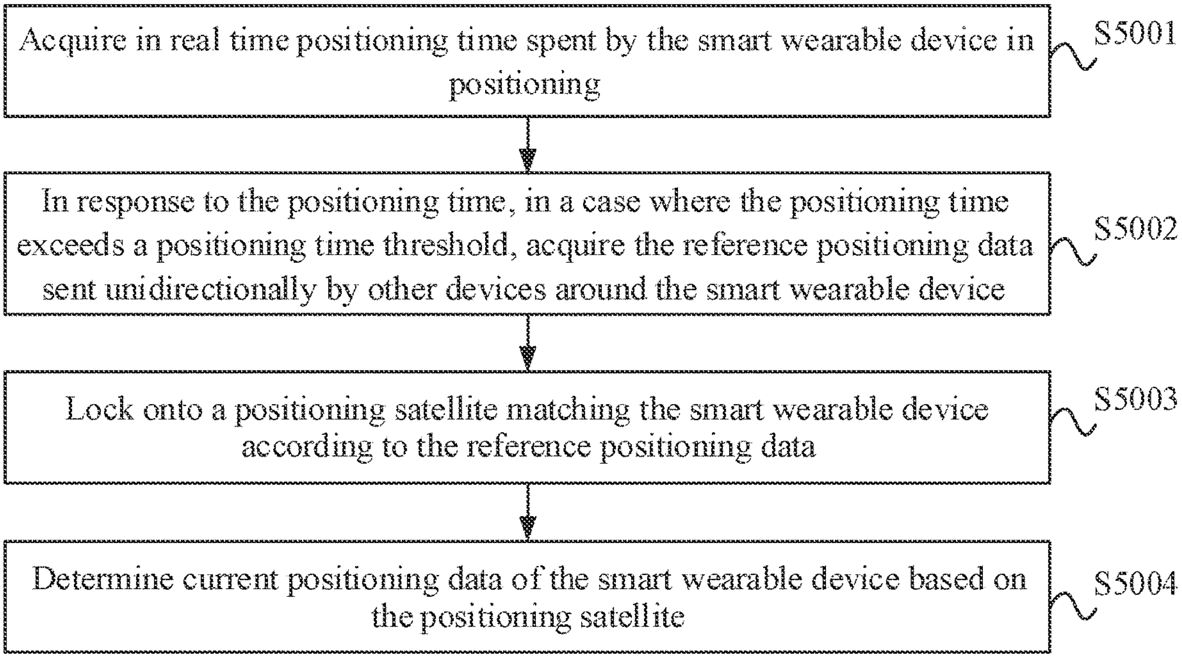
FIG. 5 is a flowchart of another method for positioning a smart wearable device according to an embodiment of the present disclosure.

In an embodiment, when the smart wearable device can be quickly positioned and the positioning time is within a certain range, the smart wearable device may be directly positioned. However, when the positioning time of the smart wearable device exceeds a certain range, the smart wearable device cannot be quickly positioned, and at this time, the smart wearable device may be positioned based on the reference positioning data sent unidirectionally by the other devices. FIG. 5 is a flowchart of another method for positioning a smart wearable device according to an embodiment of the present disclosure. As shown in FIG. 5, the method includes steps described below.

In S5001, positioning time spent by the smart wearable device in positioning is acquired in real time.

In S5002, in response to the positioning time, in a case where the positioning time exceeds a positioning time threshold, the reference positioning data sent unidirectionally by the other devices around the smart wearable device is acquired.

In S5003, a positioning satellite matching the smart wearable device is locked onto according to the reference positioning data.

In S5004, current positioning data of the smart wearable device is determined based on the positioning satellite.

The positioning manner of the smart wearable device may include, but is not limited to, a GPS positioning, a base station positioning, an A-GPS positioning, a WIFI positioning, and the like; The positioning mode of the smart wearable device being the GPS positioning is used as an example, and during the normal operation of the smart wearable device, the smart wearable device may receive, based on a GPS receiver inside the smart wearable device, a navigation message sent by a satellite in real time so as to achieve the real-time positioning of the smart wearable device. However, when the smart wearable device performs the real-time positioning by using the GPS positioning manner, the start mode of the GPS positioning includes a GPS hot start and a GPS cold start, and when the GPS hot start is performed, the smart wearable device may be quickly positioned. When the GPS cold start is performed, it takes a relatively long time. In this case, the time required for positioning of the smart wearable device can be acquired in real time. When the time required for positioning of the smart wearable device exceeds the positioning time threshold, it may be determined that the current positioning manner of the smart wearable device cannot satisfy the quick positioning requirement of the smart wearable device, which may be the GPS cold start. In this case, the reference positioning data sent unidirectionally by the other devices around the smart wearable device may be acquired so as to quickly lock onto the positioning satellite based on the reference positioning data, thereby achieving the quick positioning of the smart wearable device. When the time required for positioning of the smart wearable device does not exceed the positioning time threshold, it indicates that the smart wearable device can achieve the quick positioning, and the reference positioning data sent unidirectionally by the other devices around the smart wearable device does not need to be acquired.

Further, since the condition of the GPS cold start is that a time difference between the current positioning time and the last positioning time is relatively large and/or a distance between the current position and the last positioning location is relatively large, it is also possible to determine, according to the last positioning time of the smart wearable device and/or the last positioning location of the smart wearable device, whether the smart wearable device will perform the GPS cold start as a condition of whether to lock onto the positioning satellite based on the reference positioning data.

The last positioning location of the smart wearable device as the condition of whether to lock onto the positioning satellite based on the reference positioning data is used as an example. After the reference positioning data sent unidirectionally by the other devices around the smart wearable device is acquired, positioning data stored by the smart wearable device for the last time may also be acquired, the positioning data may directly reflect the last positioning location of the smart wearable device, and the positioning data may also be position data or ephemeris data. Whether a difference between the positioning data stored for the last time and the reference positioning data is within a preset difference range is determined. When the difference between the positioning data stored for the last time and the reference positioning data is within the preset difference range, it indicated that the distance between the current position of the smart wearable device and the last positioning location of the smart wearable device is relatively short, and the positioning satellite of the smart wearable device may be quickly locked onto directly based on the last positioning location, so that the current position of the smart wearable device is determined according to the positioning satellite of the smart wearable device. When the difference between the positioning data stored for the last time and the reference positioning data is not in the preset difference range, the current position of the smart wearable device may be considered to be far away from the positioning location for the last time, and the positioning satellite of the smart wearable device can not be locked onto quickly based on the last positioning location, and at this time, the positioning satellite matching the smart wearable device may be locked onto according to the reference positioning data. The current positioning data of the smart wearable device may be determined based on the positioning satellite, so that the quick positioning of the smart wearable device can be achieved.

Figure 6:
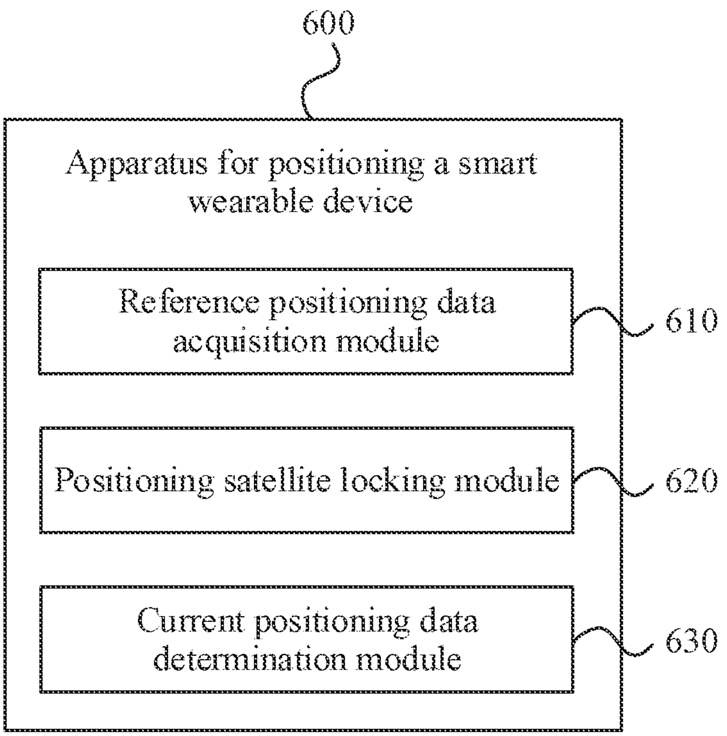
FIG. 6 is a structural block diagram of an apparatus for positioning a smart wearable device according to an embodiment of the present disclosure.

Based on the same concept, an embodiment of the present disclosure further provides an apparatus for positioning a smart wearable device. FIG. 6 is a structural block diagram of an apparatus for positioning a smart wearable device according to an embodiment of the present disclosure. The apparatus may be implemented by software and/or hardware, and is generally integrated in the smart wearable device. As shown in FIG. 6, the apparatus 600 may include a reference positioning data acquisition module 610, a positioning satellite locking module 620 and a current positioning data determination module 630. The reference positioning data acquisition module 610 is configured to acquire reference positioning data sent unidirectionally by other devices around the smart wearable device. The positioning satellite locking module 620 is configured to lock onto a positioning satellite matching the smart wearable device according to the reference positioning data. The current positioning data determination module 630 is configured to determine current positioning data of the smart wearable device based on the positioning satellite.

According to the embodiments of the present disclosure, the reference positioning data sent unidirectionally by the other devices around the smart wearable device is acquired, and a positioning satellite matching the smart wearable device is locked onto according to the reference positioning data so as to determine current positioning data of the smart wearable device based on the positioning satellite, so that the corresponding reference positioning data may be acquired without networking and data interaction, which is beneficial to shortening the time required for acquiring the reference positioning data and the amount of electric power consumed for acquiring the reference positioning data. Compared with the GPS hot start, the positioning satellite of the smart wearable device may be quickly locked onto based on the reference positioning data without traversing all satellites, so that the smart wearable device may achieve the quick positioning, which is beneficial to shortening the positioning time, improving the positioning speed, and reducing the power consumption of the smart wearable device.

Based on the same concept, an embodiment of the present disclosure further provides computer-readable storage medium storing a computer program. The computer program, when executed by a processor, enables the method for positioning a smart wearable device. The method includes that: reference positioning data sent unidirectionally by other devices around the smart wearable device is acquired; a positioning satellite matching the smart wearable device is locked onto according to the reference positioning data; and current positioning data of the smart wearable device is determined based on the positioning satellite.

The computer program stored in the computer readable storage medium according to the embodiments of the present disclosure, when executed by the processor, is not limited to implement the operation of the method for positioning a smart wearable device described above, and also implement the related operation in the method for positioning a smart wearable device according to any of the embodiments of the present disclosure.

Figure 7:
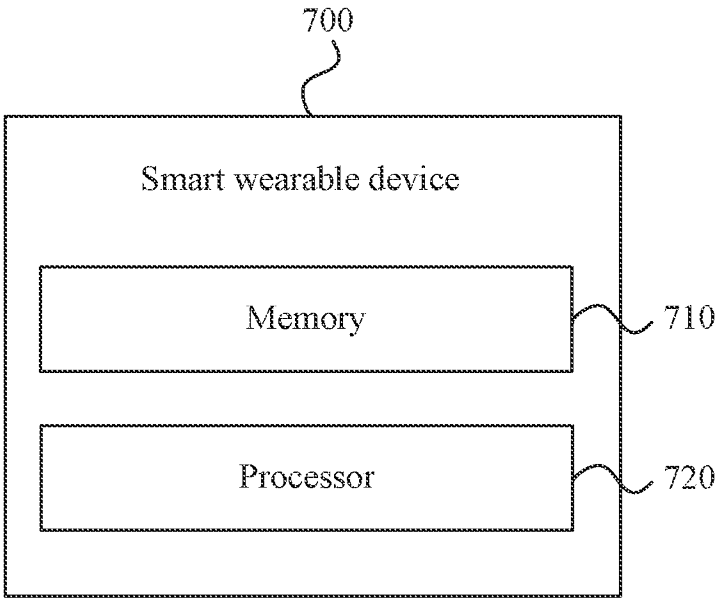
FIG. 7 is a schematic structural diagram of a smart wearable device according to an embodiment of the present disclosure.

Based on the same concept, an embodiment of the present disclosure provides a smart wearable device. The smart wearable device may be integrated in the apparatus for positioning a smart wearable device provided in the embodiments of the present disclosure. FIG. 7 is a schematic structural diagram of a smart wearable device according to an embodiment of the present disclosure. As shown in FIG. 7, the device 700 includes a memory 710, a processor 720, and a computer program (not shown) stored on the memory 710 and operable on the processor 720.

The apparatus 600 for positioning a smart wearable device is only shown as one example of the smart wearable device 700, and the smart wearable device 700 may have more or less components than those shown in the drawings, may combine two or more components, or may have different component configurations. The various components shown in the drawings may be implemented in hardware, software, or a combination of hardware and software including one or more signal processing and/or application specific integrated circuits.

The apparatus for positioning a smart wearable device, the computer-readable storage medium and the smart wearable device provided in the above-described embodiments may execute the method for positioning a smart wearable device provided in any of the embodiments of the present disclosure, and have corresponding functional modules and effects for executing the method. For technical details that are not described in detail in the above-described embodiments, reference may be made to the method for positioning a smart wearable device provided in any of the embodiments of the present disclosure.

What is claimed is:

1. A method for positioning a smart wearable device, comprising:

acquiring reference positioning data sent by other devices around the smart wearable device, wherein the reference positioning data comprises at least one of reference position data or reference ephemeris data;

locking, according to the reference positioning data, onto a positioning satellite matching the smart wearable device; and determining current positioning data of the smart wearable device based on a navigation message sent by the positioning satellite, wherein the current positioning data comprises at least one of current position data or current ephemeris data;

wherein acquiring the reference positioning data sent by the other devices around the smart wearable device comprises: acquiring positioning time spent by the smart wearable device in positioning; and in a case where the positioning time exceeds a positioning time threshold, acquiring the reference positioning data sent by the other devices around the smart wearable device.

2. The method for positioning a smart wearable device of claim 1, wherein the reference ephemeris data and the current ephemeris data each comprises ephemeris data within a first preset time, wherein the first preset time is less than or equal to 60 minutes.

3. The method for positioning a smart wearable device of claim 1, further comprising:

controlling the smart wearable device to transmit the current positioning data to enable the current positioning data to be used as reference positioning data of another device around the smart wearable device.

4. The method for positioning a smart wearable device of claim 3, further comprising:

detecting whether a user performs at least one of a large movement or a fast movement;

wherein controlling the smart wearable device to transmit the current positioning data to enable the current positioning data to be used as the reference positioning data of the another device around the smart wearable device comprises:

in a case where the user is not detected to be performing at least one of the large movement or the fast movement, controlling the smart wearable device to transmit the current positioning data.

5. The method for positioning a smart wearable device of claim 4, further comprising:

acquiring motion data of the smart wearable device;

wherein detecting whether the user performs at least one of the large movement or the fast movement comprises:

determining whether the user performs at least one of the large movement or the fast movement based on the motion data.

6. The method for positioning a smart wearable device of claim 4, further comprising:

acquiring motion mode of the smart wearable device;

wherein detecting whether the user performs at least one of the large movement or the fast movement comprises:

determining whether the user performs at least one of the large movement or the fast movement based on the motion mode.

7. The method for positioning a smart wearable device of claim 1, wherein locking, according to the reference positioning data, onto the positioning satellite matching the smart wearable device comprises:

acquiring preset full ephemeris data in the smart wearable device;

matching the reference positioning data with the preset full ephemeris data; and locking, according to the matching result, onto the positioning satellite matching the smart wearable device.

8. The method for positioning a smart wearable device of claim 7, wherein the preset full ephemeris data comprises ephemeris data of all satellites within N days, wherein $0<N\leq 30$.

9. The method for positioning a smart wearable device of claim 1, wherein a manner of the other devices for sending the reference positioning data comprises a near field transmission manner.

10. A smart wearable device, comprising a memory, a processor, and a computer program stored on the memory and operable on the processor, wherein the computer program, when executed by the processor, implements:

acquiring reference positioning data sent by other devices around the smart wearable device, wherein the reference positioning data comprises at least one of reference position data or reference ephemeris data;

locking, according to the reference positioning data, onto a positioning satellite matching the smart wearable device; and determining current positioning data of the smart wearable device based on a navigation message sent by the positioning satellite, wherein the current positioning data comprises at least one of current position data or current ephemeris data;

wherein the computer program, when executed by the processor, implements acquiring the reference positioning data sent by the other devices around the smart wearable device by: acquiring positioning time spent by the smart wearable device in positioning; and in a case where the positioning time exceeds a positioning time threshold, acquiring the reference positioning data sent by the other devices around the smart wearable device.

11. The device of claim 10, wherein the reference ephemeris data and the current ephemeris data each comprises ephemeris data within a first preset time, wherein the first preset time is less than or equal to 60 minutes.

12. The device of claim 10, wherein the computer program, when executed by the processor, implements:

controlling the smart wearable device to transmit the current positioning data to enable the current positioning data to be used as reference positioning data of another device around the smart wearable device.

13. The device of claim 12, wherein the computer program, when executed by the processor, implements:

detecting whether a user performs at least one of a large movement or a fast movement;

wherein the computer program, when executed by the processor, implements controlling the smart wearable device to transmit the current positioning data to enable the current positioning data to be used as the reference positioning data of the another device around the smart wearable device by:

in a case where the user is not detected to be performing at least one of the large movement or the fast movement, controlling the smart wearable device to transmit the current positioning data.

14. The device of claim 13, wherein the computer program, when executed by the processor, implements:

acquiring motion data of the smart wearable device;

wherein the computer program, when executed by the processor, implements detecting whether the user performs at least one of the large movement or the fast movement by:

determining whether the user performs at least one of the large movement or the fast movement based on the motion data.

15. The device of claim 13, wherein the computer program, when executed by the processor, implements:

acquiring motion mode of the smart wearable device;

wherein the computer program, when executed by the processor, implements detecting whether the user performs at least one of the large movement or the fast movement by:

determining whether the user performs at least one of the large movement or the fast movement based on the motion mode.

16. The device of claim 10, wherein the computer program, when executed by the processor, implements locking, according to the reference positioning data, onto the positioning satellite matching the smart wearable device by:

acquiring preset full ephemeris data in the smart wearable device;

matching the reference positioning data with the preset full ephemeris data; and locking, according to the matching result, onto the positioning satellite matching the smart wearable device.

17. The device of claim 16, wherein the preset full ephemeris data comprises ephemeris data of all satellites within N days, wherein $0<N\leq 30$.

18. The device of claim 10, wherein a manner of the other devices for sending the reference positioning data comprises a near field transmission manner.

* * * * *